No. 826,001. PATENTED JULY 17, 1906.
W. A. WILLIAMS.
FLUSHING TANK.
APPLICATION FILED MAY 29, 1905.
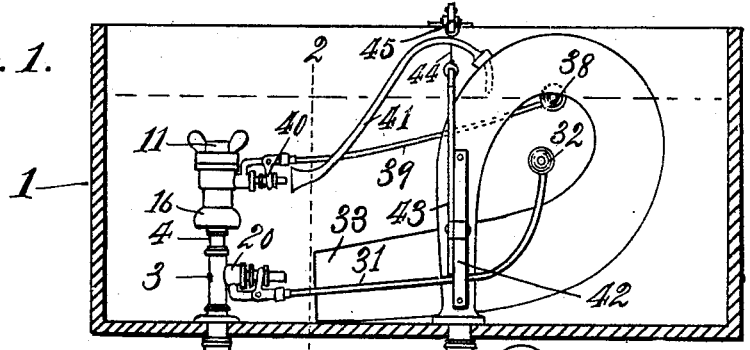
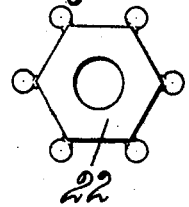
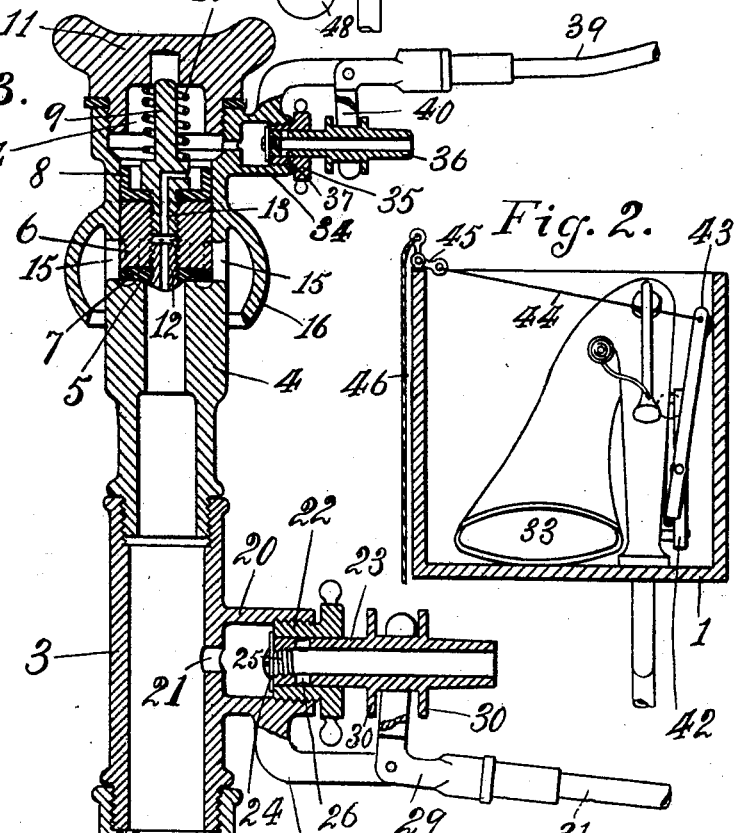

UNITED STATES PATENT OFFICE.

WILLIAM A. WILLIAMS, OF SAN FRANCISCO, CALIFORNIA.

FLUSHING-TANK.

No. 826,001.　　　Specification of Letters Patent.　　　Patented July 17, 1906.

Application filed May 29, 1905. Serial No. 262,770.

*To all whom it may concern:*

Be it known that I, WILLIAM A. WILLIAMS, a citizen of the United States, residing at San Francisco, in the county of San Francisco and State of California, have invented certain new and useful Improvements in Flushing-Tanks, of which the following is a specification.

This invention relates to improvements in flushing-tanks, and particularly to valves used therein for admitting water into said tanks, the object of the invention being to provide a valve which will when open throw a powerful jet of water, said jet being utilized to inject water from the tank either to drive the water into the siphon to flush the bowl or to assist in refilling the water seal.

A further object is to provide a valve of this character which, in combination with mechanism for releasing a float, will provide simple mechanism for emptying the tank.

In the accompanying drawings, Figure 1 is a vertical longitudinal section of the tank. Fig. 2 is a vertical cross-section on the line 2 2 of Fig. 1. Fig. 3 is an enlarged vertical section of the valve mechanism. Fig. 4 is an end view of a valve-body.

Referring to the drawings, 1 represents a tank to which water is supplied by a pipe 2. Said pipe 2 connects in the interior of the tank with a T-shaped pipe 3, upon the upper end of which is secured a valve-casing 4, having a seat 5 for the valve-plunger 6. Said plunger is provided on its end with a washer 7, which rests upon the seat, and with a cup-shaped packing 8 at the upper end. Around the stem 9 of said plunger is a coiled spring 10, abutting against the cap 11 and normally depressing the plunger upon its seat. The screw 12, which holds the washer 7 to the plunger, and also the stem 9 are channeled, as shown at 13, to permit the passage of water from below the plunger to the chamber 14 above the same, thereby causing the pressure of the water in said chamber 14 to force the plunger onto its seat. The spring 10 is for the purpose of overcoming friction. The valve-casing is formed with apertures 15 above the seat, through which, when the plunger is raised, the water can be discharged into the tank, and said casing is also formed with an inverted-cup-shaped shield 16, which having its lower edge or mouth directed inward or toward the casing 4 serves to confine the water passing through said apertures 15 and direct it downward around the side of the casing and the T-shaped pipe, and thus prevent it splashing upward in the tank.

On the side of the T-shaped pipe 3 is formed a lateral extension 20, connecting with said pipe through a small aperture 21, and into said extension is screwed a valve-body 22, in which slides a hollow valve 23, carrying a washer 24, secured to the valve by a screw 25. When the valve 23 is pressed inward, water can pass from the pipe 3, through the aperture 21, around the washer 24 on the end of the valve, and into the interior of the valve through apertures 26, which are then exposed, escaping at the end of the hollow valve and forming a jet. When the valve is moved outward in the valve-body, the washer 24 then rests against the end of the valve-body, which forms a valve-seat for said washer, preventing the passage of water in the hollow plunger. Upon an arm 28, formed integral with the extension 20, is pivoted a forked lever 29, which engages collars 30, formed upon the hollow valve or plunger 23, the other end of the lever 29 being secured to a rod 31, carrying a float 32.

The jet from the hollow plunger is discharged into the mouth of a siphon 33, the entrance or larger end of which preferably rests upon the bottom of the tank and is formed elliptical or vertically flattened, the object being to discharge as much water as possible into the siphon at a very low level. This siphon is formed in a continuous curve, except the horizontal entrance end and the vertical discharge end.

The casing 4 is formed with an extension 34, into which is screwed a valve-body 35, in which slides a valve 36, having apertures 37 similar to the apertures 26 and being hollow, so as to discharge a jet thereform. This valve is similar to the lower valve, and the description of the latter will therefore apply to the former. It is reciprocated by means of a float 38, having a stem 39, attached to a lever 40. This valve discharges a jet into the mouth of a refilling-tube 41, which leads to the upper portion of the siphon.

On the side of the siphon is secured a guide 42, between which guide and the siphon passes the stem 31 of the float 32, and upon said guide is pivoted a latching-lever 43, the upper end of which is attached by a wire or cord 44 to a bell-crank lever 45, to another arm of which is attached a chain or cord 46.

The operation of the apparatus is as follows: Upon pulling the chain 46 the latch is withdrawn from its position, engaging the float 32, and the float, which is normally submerged, immediately springs upward by reason of its buoyancy. This moves the lower plunger inward, opening the lower jet-valve and discharging a jet into the lower end of the siphon. This jet by its momentum therefore drives forward the water in the siphon, the water thus injected completely filling the siphon and siphoning the tank. As the water-level falls in the tank, the floats descend, the lower float closing the lower jet and the upper float opening the upper jet. The opening of the upper jet reduces the pressure above the main plunger, so that said plunger rises under the action of the greater pressure beneath, and the water is discharged from the supply-pipe through the openings 15 into the tank. This starts the refilling of the tank. The discharge of the water in the upper jet not only serves to lift the plunger from its seat and admit water into the tank, but discharges water into the top of the siphon, and, furthermore, when the water in the tank has reached the level of the mouth of the refilling-tube said jet injects water from the tank into said mouth and carries it upward into the top of the siphon, thus refilling the water seal in case the latter has been siphoned, the water so injected falling down the discharge-pipe of the siphon to the water seal 48, where it remains and forms a seal. As the water rises in the tank the upper jet is closed, and the lower jet is also closed on account of the engagement of the float-stem 31 with the latching-lever 43, which holds said float-stem down. By means of this construction very small floats can be used, for the floats are used to operate very small and light valves working against very small pressures. With present constructions the floats are used to operate large valves, such as the main valve or plunger 6 in the main casing. This requires a float of six inches in diameter. With the present construction floats of two inches in diameter may be used. The present construction also avoids any whistling noise while the tank is filling, because as the floats rise the pressure of the water at the back of the jet-valves forces said valves to their seats and shuts off the water suddenly. A further advantage of the construction is that the valve is easily taken to pieces and assembled. The device occupies very little room, especially the floats, and on account of these being small there is no longer any danger of their rubbing up against the sides of the tank, causing them to wear out and leak, which is an objection to the floats at present in use.

It will be observed that the construction of the jet-valves is such that before the washer 24 reaches its seat the water is cut off by the apertures 26 in the valve, passing into the valve-casing or body. The washer then makes the valve absolutely water-tight.

The inverted shield 16 prevents the entering water making a noise and saves an extra tube commonly used to bring the water to the bottom of the tank.

I claim—

1. In an apparatus of the character described, the means for throwing a jet of water comprising a valve-body, a tubular valve sliding therein and having a discharge-opening in line with the tubular aperture of the valve to discharge the jet therefrom, said valve having apertures in its sides, and having a washer secured upon its end adapted to rest against the end of the valve-body which then forms a valve-seat for said washer, a lever operatively connected to said valve to reciprocate the same, and a float connected to said lever whereby the rise and fall of the float reciprocates the valve, substantially as described.

2. In combination with a water-inlet pipe having a valve-controlled inlet-aperture, a siphon, a pipe leading therefrom having a water seal, an open-ended pipe leading to the top of the siphon, and a jet-valve connected with the inlet-pipe and discharging into the mouth of the open-ended pipe, substantially as described.

3. In combination with a tank, a water-inlet pipe having a valve-seat, a plunger on said seat, means for admitting pressure-water to the top of the plunger to balance the valve, a siphon, a jet-valve connected to said inlet-pipe below the valve-seat, said jet-valve being provided with means, when opened, for discharging a jet into the mouth of the siphon, a float arranged by its rise to open said valve, a latching device for holding down said float, and means for operating said latching device to release the float to discharge the jet to siphon the tank, substantially as described.

4. In combination with a water-inlet pipe having a valve-controlled inlet-aperture, a siphon, a pipe leading therefrom having a water seal, a refilling-pipe leading from the top of the siphon, and a valve connected with the inlet-pipe and controlling said refilling-pipe, substantially as described.

5. In combination with a tank, a valve-controlled water-inlet pipe for filling the tank, a jet-valve chamber connected with the water-inlet pipe provided with means, when open, for discharging a jet, a siphon for siphoning the tank into the mouth of which the jet is discharged, a float for operating by its rise said jet-valve, a latching device for controlling the rise of the float, and means for operating said latching device to release the float to discharge the jet to siphon the tank, substantially as described.

In witness whereof I have hereunto set my hand in the presence of two subscribing witnesses.

W. A. WILLIAMS.

Witnesses:
FRANCIS M. WRIGHT,
BESSIE GORFINKEL.